United States Patent
Gu et al.

(10) Patent No.: US 11,431,556 B2
(45) Date of Patent: Aug. 30, 2022

(54) CROSS-LAYER NETWORK FAULT RECOVERY SYSTEM AND METHOD BASED ON CONFIGURATION MIGRATION

(71) Applicants: Beijing University of Posts and Telecommunications, Beijing (CN); State Grid Liaoning Power Co., Ltd. Dalian Power Supply Company, Dalian (CN)

(72) Inventors: Rentao Gu, Beijing (CN); Meng Lian, Beijing (CN); Lin Liu, Dalian (CN); Jingzhao Luan, Dalian (CN); Baoli Wang, Dalian (CN); Yuefeng Ji, Beijing (CN)

(73) Assignees: Beijing University of Posts and Telecommunications, Beijing (CN); State Grid Liaoning Power Co., Ltd. Dalian Power Suoply Company, Dalian (CN)

( * ) Notice: Subject to any disclaimer, the term of this patent is extended or adjusted under 35 U.S.C. 154(b) by 54 days.

(21) Appl. No.: 17/192,151

(22) Filed: Mar. 4, 2021

(65) Prior Publication Data
US 2021/0281471 A1    Sep. 9, 2021

(30) Foreign Application Priority Data
Mar. 6, 2020    (CN) .......................... 202010149984.5

(51) Int. Cl.
*H04L 12/24*    (2006.01)
*H04L 41/0668*    (2022.01)
(Continued)

(52) U.S. Cl.
CPC .......... *H04L 41/0668* (2013.01); *H04L 45/22* (2013.01); *H04L 45/28* (2013.01); *H04L 45/64* (2013.01); *H04L 45/74* (2013.01)

(58) Field of Classification Search
CPC ..... H04L 41/0668; H04L 45/22; H04L 45/28; H04L 45/64; H04L 45/74; H04L 41/0663; H04L 41/0654; H04L 41/0672
See application file for complete search history.

(56) References Cited

U.S. PATENT DOCUMENTS

| 10,999,127 B1* | 5/2021 | Zuber .................. H04L 41/065 |
| 2015/0295752 A1* | 10/2015 | Yamashita .............. H04L 41/40 370/225 |

(Continued)

FOREIGN PATENT DOCUMENTS

| CN | 104767676 A | 7/2015 |
| CN | 106374996 A | 2/2017 |

(Continued)

*Primary Examiner* — Walli Z Butt
(74) *Attorney, Agent, or Firm* — Clements Bernard Baratta; Lawrence A. Baratta, Jr.

(57) ABSTRACT

The invention discloses a cross-layer network fault recovery system and method based on configuration migration. The method includes: an upper layer switching network controller sends device fault information to a super controller; the super controller performs a fault device location, and selects a backup upper layer switching network device in an upper layer switching network; the super controller generates a third forwarding table, and delivers the third forwarding table to an upper layer switching network controller and an underlying layer switching network controller; the upper layer switching network controller generates a first forwarding table to be updated according to the third forwarding table, and delivers the first forwarding table to neighbor devices of the fault device and the backup upper layer switching network device; the underlying layer switching network controller calculates underlying layer switching network transmission channels according to the third forwarding table, and updates a second forwarding table of the underlying layer switching network devices on these trans- (Continued)

mission channels. The invention utilizes the reconfigurability of the underlying layer switching network to allow rapid replacement of the fault device and service recovery in the upper layer switching network.

14 Claims, 3 Drawing Sheets

(51) Int. Cl.
*H04L 45/00* (2022.01)
*H04L 45/28* (2022.01)
*H04L 45/64* (2022.01)
*H04L 45/74* (2022.01)

(56) References Cited

U.S. PATENT DOCUMENTS

| | | | |
|---|---|---|---|
| 2016/0226753 A1* | 8/2016 | Young | H04L 47/17 |
| 2017/0111231 A1* | 4/2017 | Ashida | H04L 69/324 |
| 2018/0109443 A1* | 4/2018 | Srinivasan | H04L 49/25 |
| 2018/0367392 A1* | 12/2018 | Harneja | H04L 41/06 |

FOREIGN PATENT DOCUMENTS

| | | |
|---|---|---|
| CN | 106817301 A | 6/2017 |
| CN | 108667727 A | 10/2018 |
| CN | 109391488 A | 2/2019 |
| CN | 109905275 A | 6/2019 |

\* cited by examiner

CROSS-LAYER NETWORK FAULT RECOVERY SYSTEM AND METHOD BASED ON CONFIGURATION MIGRATION

CROSS REFERENCE TO RELATED APPLICATIONS

This application claims priority to Chinese Application No. 202010149984.5, filed on Mar. 6, 2020, and entitled "CROSS-LAYER NETWORK FAULT RECOVERY SYSTEM AND METHOD BASED ON CONFIGURATION MIGRATION", which is incorporated herein by reference.

TECHNICAL FIELD

The present invention relates to the field of communication technology, and in particular to a fast fault recovery method and system for a two-layer switching network.

BACKGROUND

In recent years, the rapid development of new technologies such as unmanned driving, Virtual Reality (VR), satellite positioning, etc., has brought great changes to the whole Information Technology (IT) industry. In order to guarantee the quality of these services, low latency and high reliability communication solutions are required in forward/backhaul networks.

Software Defined Network (SDN) divides a traditional network system into a control plane and a data plane. The control plane is for data forwarding decision, while the data plane is only responsible for the forwarding of underlying data. It adopts a centralized control method and flexible programming interface to achieve forwarding mechanism based on flow table, without relying on underlying network devices. Differences between underlying network devices are shielded, and flexible and efficient management and control of network devices is allowed. Characteristics of SDN, such as flexibility, openness, programmability, data-control separation, and centralized control, allow a quick deployment of new network applications. The merit of SDN has been widely recognized in the industry.

Network Functions Virtualization (NFV) divides network node functions into several functional blocks through virtualization technology. The blocks are individually implemented and managed by software, so that network functions are no longer limited by hardware architectures. NFV can provide network functions that would otherwise require hardware implementation, such as routing, firewall, and cross-layer communication. Dependence on hardware devices is reduced, openness of the network is increased, and the management is separated from the underlying network. The network can be dynamically adjusted and controlled on demand. These merits of NFV have been widely recognized in the industry.

Multi-Layer network (such as IP+optical network) provides users with high-capacity and high-speed transmission services. In multi-layer network, a fault in the underlying network will trigger rapid protection and a recovery process. However, a fault recovery in the upper network typically requires protocol state synchronization and service rerouting, which is very time-consuming. The protocol state synchronization takes a lot of time in the recovery process. More importantly, the recovery of a failed node may result in the rerouting of thousands of services. Previous researches on upper layer network recovery generally focus on service recovery/rerouting in the service management layer, and mainly attempts to recover routing service instead of network. In addition, in these methods, the physical network resources are assumed to remain unchanged, and services are recovered with remaining resources in the network. However, as network technology, and in particular, software-defined network technology develops, current underlying networks are variable. Therefore, adjustment of the underlying layer network may realize network reconfiguration, such that protocol state synchronization and service rerouting can be avoided.

SUMMARY

Embodiments of the present invention provide a cross-layer network fault recovery system and method based on configuration migration, so as to reduce the time for cross-layer network fault recovery. Specifically, the technical solutions are as follows.

In order to achieve the above objective, a first aspect of embodiments of the present invention discloses a cross-layer network fault recovery system based on configuration migration. The system includes at least one upper layer switching network controller, at least one underlying layer switching network controller, at least one super controller, at least two upper layer switching network devices and at least one underlying layer switching network device. The upper layer switching network controller manages the upper layer switching network. The underlying layer switching network controller manages the underlying layer switching network. The super controller manages the upper layer switching network controller and the underlying layer switching network controller in collaboration. The upper layer switching network is responsible for the analysis, management and short distance transmission of service flow, and the underlying layer switching network controller is responsible for the service transmission between upper layer switching network nodes.

At least one upper layer switching network controller is configured for receiving and processing fault information sent by a upper layer switching network device or generating fault information by identifying a fault in an upper layer switching network device in case of a fault in network, and send the fault information to the super controller; receiving a third forwarding table sent by the super controller, generating first forwarding table entries to be updated for neighbor devices of the fault device in the upper layer switching network and a backup upper layer switching network device, and delivering the updated first forwarding table entries to neighbor devices of the fault device in the upper layer switching network and the backup upper layer switching network device. The first forwarding table is used for describing switching behaviors of the upper layer service by upper layer switching network devices. The third forwarding table describes connections and service switching behaviors between neighbor devices of the fault device, the backup upper layer switching network device and the underlying layer switching network device, such that the backup upper layer switching network device has the same service switching configuration as the fault device in the upper layer switching network, and can carry all functions of the original fault upper layer switching network device.

At least one super controller is configured for receiving fault information sent by the upper layer switching network controller after the upper layer switching network controller determines the fault device in the upper layer switching network, and searching for a fault device in the upper layer switching network in the first forwarding table, determining the fault device in the upper layer switching network and a fault port; selecting an appropriate backup upper layer switching network device in the upper layer switching network through a topology table and attributes of upper layer switching network devices; determining connections between the backup upper layer switching network device and all neighbor devices of the fault device in the upper layer switching network, and connections between the backup upper layer switching network device and all neighbor devices of the fault device in the upper layer switching network device and the underlying layer switching network device, according to a connection with the backup upper layer switching network device, underlying switching network device transmission information suitable for the transmission of service in the fault upper layer switching network device, neighbor device information of the fault upper layer switching network device, the backup upper layer switching network information; generating the third forwarding table and delivering it to an upper layer switching network controller and an underlying switching network controller.

At least one underlying layer switching network controller is configured for receiving a third forwarding table sent by the super controller, obtaining a second forwarding table entry from the third forwarding table, calculating underlying layer switching network transmission channels for implementing connections between neighbor devices of the fault device and the backup upper layer switching network device reflected in the third forwarding table, and updates the second forwarding table of the underlying layer switching network device on the transmission channels.

Optionally, the upper layer switching network controller further includes:

an upper layer switching network topology collection module, which is present in the upper layer switching network controller of a control plane and is used for collecting all upper layer switching network device information in an upper layer data switching network, including upper layer switching network device attributes, upper layer switching network topology, status of ports of upper layer switching network devices and status of links between the upper layer switching network devices. Further, the upper layer switching network topology collection module also needs to collect port information and address information of each upper layer switching network device, traffic statistics information of each port, matching times of the first forwarding table of upper layer switching network devices, and information of traffic, delay and Quality of Service (QoS) of the link. The upper layer switching network topology collection module periodically sends the collected information to a calculation module.

Optionally, the address resolution module is present in the upper layer switching network controller of the control plane, and is used for analyzing forwarding control information of a new service upon its first entry into an upper layer switching network device, and sending the information to a configuration generation and an update module.

Optionally, the fault information module is present in the upper layer switching network controller of the control plane, and is used for receiving and processing fault information sent by the upper layer switching network device, or generating fault information by identifying a fault device in the upper layer switching network, and sending the fault information to a fault location module for fault location.

Optionally, the configuration generation and the update module is present in the upper switching network controller of the control plane, and is configured for generating upper layer switching network device configuration information and update configuration. When a new service reaches the upper layer switching network device, the configuration generation and the update module receives path information sent by a calculation module, generates a first forwarding table, sends the first forwarding table to a fault location module for backup, and delivers the first forwarding table to all upper layer switching network devices on the path. when a fault occurs, the configuration generation and the update module receives a third forwarding table sent by a super controller, generates first forwarding table entries to be updated for neighbor devices of the fault device in the upper layer switching network and the backup upper layer switching network device, and delivers the updated first forwarding table entries to the neighbor devices of the fault device in the upper layer switching network device and the backup upper layer switching network device.

Optionally, the underlying layer switching network controller further includes:

an underlying switching network topology collection module, which is present in an underlying layer switching network controller of a control plane, and is used for collecting the topology of all underlying layer switching network devices in an underlying layer data switching network, status of the underlying layer switching network devices, and status of link paths. Further, the underlying switching network topology collection module needs to collect port information and address information of each underlying layer switching network device, traffic statistics of each port, matching times of the second forwarding table of each underlying layer switching network device, and information of traffic, delay and Quality of Service (QoS) of the link, and the underlying switching network topology collection module periodically sends the collected information to the calculation module.

Optionally, a transmission channel adjustment module is present in the underlying layer switching network controller of the control plane, and is used for receiving information sent by the calculation module, generating or updating a second forwarding table according to the result, and delivering the second forwarding table to the underlying layer switching network device.

Optionally, the super controller further includes a topology generating module, which is present in the super controller of the control plane, and is used for receiving an upper layer switching network topology result and an underlying layer switching network topology result sent by an upper layer topology collection module and an underlying layer topology collection module, synthesizing a double layer switching network topology connection table, and sending the double layer switching network topology connection table to the calculation module.

Optionally, the fault location module is present in the super controller of the control plane, and is used for receiving a first forwarding table backup from the configuration generation and update module and fault information sent by a fault information module in the upper layer switching network controller for fault location, and sending the fault location result to the calculation module.

Optionally, the calculation module is present in the super controller of the control plane, and when the upper layer switching network device receives a new service, the calculation module calculates a transmission path of the new service in the upper and underlying layer switching networks according to source and a destination addresses of the service sent by the address resolution module and a topology connection table sent by the topology generation module, and sends the path result to the configuration generation and update module and the transmission channel adjustment module. The path result includes service identification information transmitted by the service, source and destination addresses of the service, an ID of each switching device passed on the path, an ingress port number, and an egress port number.

When a fault occurs, according to a topology result sent by the topology generation module, the upper layer switching network device attributes, and a fault upper layer switching network device ID sent by the fault location module, an upper layer switching network device that can communicate with the upper layer switching network device through the connection between the underlying layer switching network and all neighbor devices of the fault upper layer switching network device, can transmit a service affected by the fault to the neighbor devices through the underlying switching network, and has a switching capacity not less than the switching capacity of the fault upper layer switching network device is searched as a backup switching network device. According to backup upper layer switching network device information, the first forwarding table of all neighbor devices of the fault upper layer switching network device connected to the fault upper layer switching network device through the underlying layer switching network, a third forwarding table is generated and delivered to the configuration generation and update module and the transmission channel adjustment module.

In order to achieve the above objective, the present invention proposes a cross-layer network fault recovery method based on configuration migration. The method is applied to a double layer switching network, including an upper layer switching network (upper layer network) and an underlying switching network (underlying network). The methods is described below.

When a fault occurs in the upper layer switching network, the upper layer switching network controller identifies a network fault and sends the fault information to the super controller.

The super controller performs the fault location according to the fault information and the first forwarding table backup.

The super controller selects a device from upper layer switching network devices as a backup upper layer switching network device for the fault device according to a fault location result, the upper layer switching network device attributes, and the upper and underlying layer switching network topology information. The backup upper layer switching network device can take place of the fault upper layer switching network device in operation, and can communicate with the neighbor devices of the fault device through the underlying layer switching network and can transmit services affected by the fault.

The super controller determines the connections between the backup upper layer switching network device and all neighbor devices of the fault device in the upper layer switching network, and the connections between the backup upper layer switching network device, all neighbor devices of the fault devices in the upper layer switching network and the underlying layer switching network device based on at least the first forwarding table of all neighbor devices of the fault device, generates a third forwarding table, and delivers the third forwarding table to the upper layer switching network controller and the underlying layer switching network controller;

The upper layer switching network controller extracts, according to the third forwarding table, first forwarding table entries for each service affected by the fault for a previous neighbor device, a backup upper switching network device, and a next neighbor device; and updates the first forwarding table entries for the previous neighbor device, the backup upper switching network device, and the next neighbor device. The upper layer switching network controller sends the updated first forwarding table to the super controller, and updates the first forwarding table backup in the super controller. Wherein, the previous neighbor device is a device through which the service affected by the fault is transmitted before reaching the fault upper layer switching network device, and the next neighbor device is a device through which the service affected by the fault is transmitted after reaching the fault upper layer switching network device.

The underlying switching network controller calculates a second forwarding table entry of the underlying switching network device between the previous neighbor device and the backup upper layer switching network device and between the backup upper layer switching network device and the next neighbor device according to the third forwarding table and the connections between the neighbor devices of the fault upper layer switching network device and the backup upper layer switching network device reflected in the third forwarding table, and updates the second forwarding table of the underlying layer switching network device.

Optionally, the topology connection table is established in the following way.

Each upper layer switching network device in the upper layer switching network and each underlying layer switching network device in the underlying layer switching network run a topology discovery protocol to obtain identification information and port information of each upper layer switching network device and each underlying layer switching network device, to obtain device and port connections between the upper layer switching network devices, between the underlying layer switching network devices, and between the upper layer switching network devices and the underlying layer switching network devices, to establish a double layer switching network connection topology, and generates the topology table.

Optionally, the first forwarding table is updated in the following process.

when the upper layer switching network device receives a service for the first time, the upper layer switching network device sends a service packet to the upper layer switching network controller. The upper layer switching network controller extracts service information from the data packet and sends the service information to the super controller.

The super controller calculates, according to the service information sent by the upper layer network controller and topology results of the upper layer and underlying layer switching networks, upper layer and underlying layer switching network transmission paths of the service. The results of the upper layer switching network transmission path and the underlying layer switching network transmission path are respectively sent to the upper layer switching network controller and the underlying layer switching network controller. The results of the upper layer switching network transmission path and the underlying layer switching network transmission path need to include service information, transmission path device information, and transmission path port information, for example, it need to include source and destination addresses of the service, an ID of each switching device passed on the path, an ingress port number, and an egress port number.

The upper layer switching network controller generates first forwarding table entries for upper layer switching network devices in the upper layer switching network transmission path to forward the service, according to the result of the upper layer switching network transmission path, and updates the first forwarding table of each upper switching network device in the upper layer switching network transmission path. The first forwarding table entry needs to include service information, information of upper layer switching network device through which the service passes, and information of upper layer switching network device ports through which the service passes. For example, it needs to include service identification information, service source and destination host addresses, an ID of the upper layer switching network device, the number of an ingress port through which the service enters the upper layer switching network device, and the number of an egress port number through which the service leaves the upper layer switching network device. The upper layer switching network controller delivers the updated first forwarding table to each upper layer switching network device in the upper layer switching network transmission path.

When a fault occurs, the upper layer switching network controller receives a third forwarding table sent by the super controller, extracts relevant information of the upper layer switching network from the third forwarding table, generates first forwarding table entries to be updated for neighbor devices of the fault upper layer switching network device and the backup upper switching network device, and delivers the updated first forwarding table to the neighbor devices of the fault device and the backup upper layer switching network device. The first forwarding table entry needs to include service information in the neighbor devices of the fault upper layer switching network device and the backup upper layer switching network device, upper layer switching network device information through which the service passes, and upper layer switching network device port information through which the service passes, for example, it needs to include service identification information, source and destination host addresses of the service, an ID of the upper layer switching network device, the number of an ingress port through which the service enters the upper layer switching network device, and the number of an egress port through which the service leaves the upper layer switching network device.

Optionally, the second forwarding table is updated in the following process.

After the underlying layer switching network controller receives an underlying layer switching network transmission path sent by the super controller, the underlying layer switching network controller generates second forwarding table entries for underlying layer switching network devices in the underlying layer switching network transmission path to forward the service, according to the result of the underlying layer switching network transmission path; updates the second forwarding table and delivers the second forwarding table to each underlying layer switching network device in the underlying layer switching network transmission path. The second forwarding table entry needs to include device information and port information required for service forwarding in the underlying layer network, such as an ID of the underlying layer switching network device, the number of an ingress port through which the service enters the underlying layer switching network device, and the number of an egress port through which the service leaves the underlying layer switching network device.

When a fault occurs, the underlying switching network controller receives a third forwarding table sent by the super controller, calculates second forwarding table entries and underlying layer switching network transmission channels for transmitting the service affected by the fault between the previous neighbor device and the backup upper layer switching network device and between the backup upper layer switching network device and the next neighbor device according to the connections between the neighbor devices of the fault upper layer switching network device and the backup upper layer switching network device reflected in the third forwarding table, and updates the second forwarding table of the underlying layer switching network device. The second forwarding table entry includes the underlying layer switching network device information and port information on the transmission channel between the neighbor devices of the fault upper layer switching network device and the backup upper layer switching network device. For example, it includes an ID of the underlying layer switching network device, the number of an ingress port through the service enters the upper layer switching network device, and the number of an egress port through which the service leaves the upper layer switching network device.

Optionally, the establishment of the third forwarding table includes the following process.

After the fault occurs, the super controller determines connections between the backup upper layer switching network devices and all neighbor devices of the fault upper layer switching network device, and connections between the backup upper layer switching network device, all neighbor devices of the fault device in upper layer switching network device and the underlying layer switching network device based on at least the first forwarding table of all neighbor devices of the fault device, generates a third forwarding table, and delivers the third forwarding table to the upper layer switching network controller and the underlying layer switching network controller.

The third forwarding table entry needs to include service information, information of devices through which the service passes, and information of device ports through which the service passes. For example, it needs to include service identification information, an ID of a previous neighbor device, the number of an egress port of the previous neighbor device, an ID of the underlying layer switching network device connected to the previous neighbor device, the number of an ingress port of the underlying layer switching network device, the number of an egress port of the underlying layer switching network device, an ID of a backup upper layer switching network device, the number of an ingress port of the backup upper layer switching network device, the number of an egress port of the backup upper layer switching network device, an ID of the underlying layer switching network device of a next neighbor connected to the backup upper layer switching network device, the number of an ingress port of the underlying layer switching network device, the number of an egress port of the underlying layer switching network device, an ID of the next neighbor device, an ingress port number of the next neighbor device. Each third forwarding table entry is utilized to forward a service affected by the fault from the previous neighbor device through the backup upper layer switching network device to the next neighbor device. The third forwarding table is generated by combining all the third forwarding table entries.

The purpose of the embodiments of the present invention is to provide a cross-layer network fault recovery system and method based on configuration migration, so as to reduce the delay of the network fault recovery. When an upper layer switching network fault occurs, the upper layer network controller receives and processes fault information sent by the upper layer switching network device, or the upper layer network controller identifies a fault device, generates fault information, and sends the processed or generated fault information to the super controller for fault location. The super controller calculates a backup upper layer switching network device for recovering the network fault through a topology table, the fault location result and first forwarding table entries; generates a third forwarding table; and sends the third forwarding table to the upper layer switching network controller and the underlying layer switching network controller. The upper layer switching network controller updates a first forwarding table according to the third forwarding table, and delivers the first forwarding table to the upper layer switching network devices. The underlying layer switching network controller updates a second forwarding table according to the third forwarding table, and delivers the second forwarding table to the underlying layer switching network devices. The network fault recovery is completed.

The cross-layer network fault recovery system and method of the present invention focus on network recovery instead of service recovery, and utilize the reconfigurability of the underlying layer switching network to realize the rapid replacement and service recovery of the upper layer switching network fault device. By migrating the configuration of the fault node device, the present invention only recovers the fault node device. Network fault is recovered in the network level, and changes in the overall network connection due to service recovery can be avoided. In addition, fault recovery in the network level can avoids service rerouting and synchronization of multiple protocols in the upper layer switching network. As such, chain reactions of a large number of time-consuming service rerouting and complex protocol synchronization processes in the existing recovery technology can be avoided. In addition, since configuration migration is performed only on the fault node, the network configuration remains unchanged before and after the fault recovery, and the double layer network presents consistency, and there is no need to change the network management and operation mode. The cross-layer network fault recovery method of the embodiment of the present invention makes full use of the flexibility of SDN, simplifies cross-layer collaborative process of the double layer network, reduces the time for calculation and planning of the service recovery path, reduces network changes caused by fault recovery, and significantly improves the efficiency of double layer network fault recovery. The cross-layer network fault recovery method of the embodiment of the present invention can meet requirements of AI, Internet of Things and other emerging technologies for fault recovery delay.

BRIEF DESCRIPTION OF THE DRAWINGS

To clearly describe the technical solutions in the embodiments of the present invention or in the prior art, a brief description of the drawings with reference to which the embodiments or the prior art are described is provided.

DETAILED DESCRIPTION

The technical solution of the embodiments of the present application will be described below with reference to the drawings in the examples of the present application.

The invention aims to recover a fault network, avoid the complicated rerouting calculation and time-consuming protocol synchronization in the fault recovery process of the double layer switching network through the configuration migration of the fault node, and greatly reduce the fault recovery time. In addition, due to only configuration migration is performed for the fault node, the network configuration remains unchanged before and after fault recovery, the double layer network presents consistency to the outside, and there is no need to change the network management and operation mode.

Figure 1:
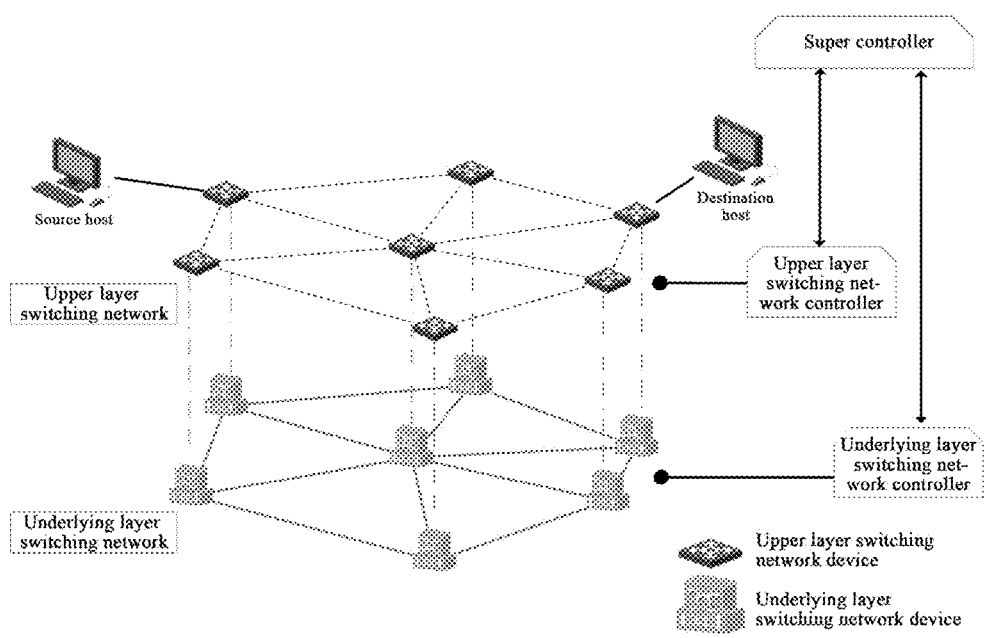
FIG. 1 is a schematic diagram of a double layer network according to an embodiment of the invention.
Figure 2:
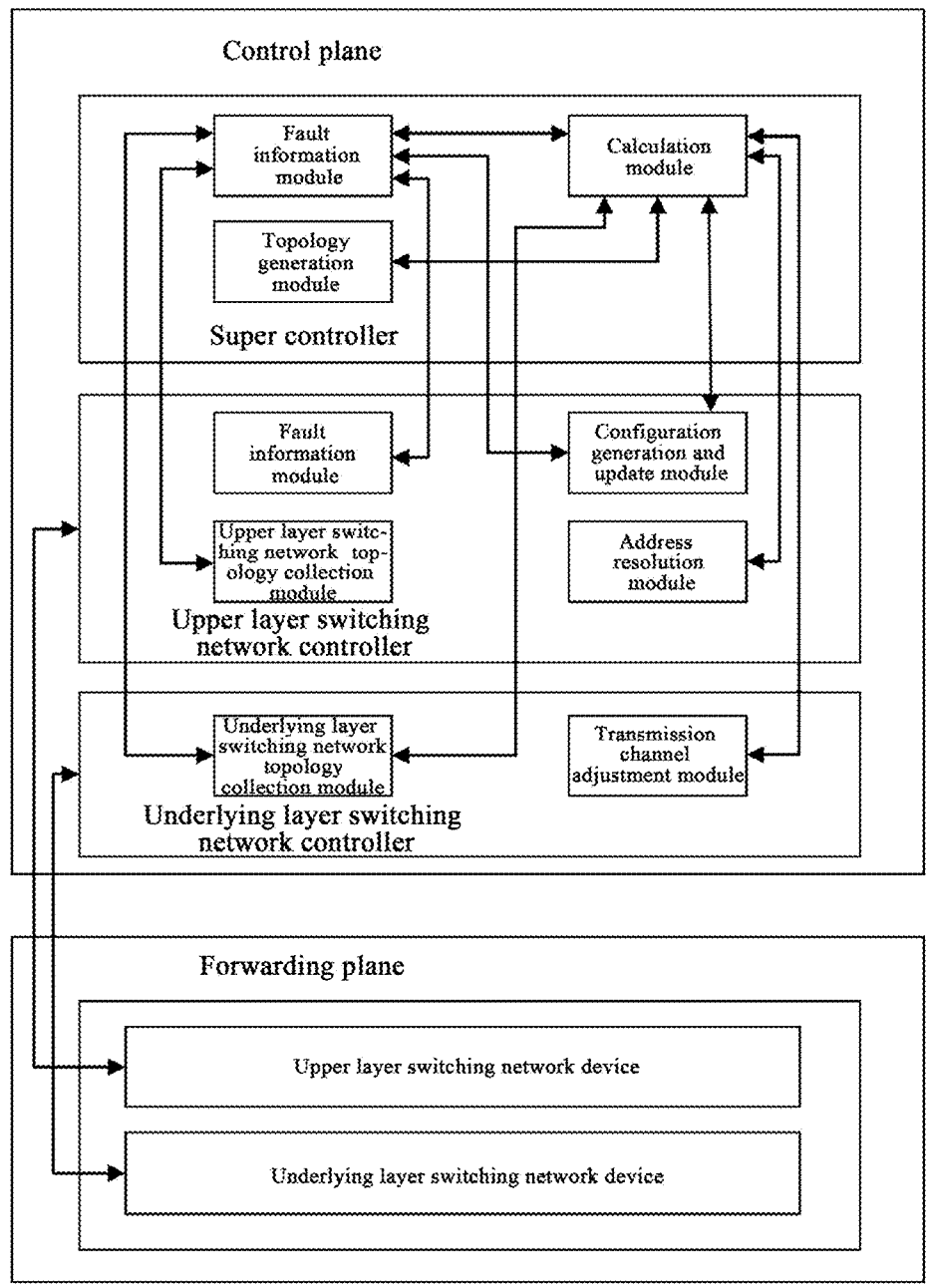
FIG. 2 is a schematic structural diagram of a low delay cross-layer network fault recovery system according to an embodiment of the present invention.

FIG. 1 is a schematic structural diagram of the cross-layer network in which the system and method of embodiments are applied. In order to better illustrate the cross-layer network fault recovery system in embodiments of the present invention, a low delay cross-layer network fault recovery system is first described with reference to FIG. 2. FIG. 2 is a schematic structural diagram of a low delay cross-layer network fault recovery system according to an embodiment of the present invention. In FIG. 2, the cross-layer network fault recovery system is divided into a control plane and a forwarding plane. The control planes controls service data flow exchanged in the double layer network. The forwarding plane transmits data flow under the control of the control plane.

The control plane includes three apparatus: a super controller, an upper layer switching network controller and an underlying layer switching network controller. The super controller includes: a topology generation module, a calculation module, and a fault information module. The upper switching network controller includes: an upper layer switching network topology collection module, a fault information module, a configuration generation and update module, and an address resolution module. The underlying layer switching network controller includes: an underlying layer switching network topology collection module and a transmission channel adjustment module. The forwarding plane includes an upper layer switching network device and an underlying layer switching network device.

In the embodiment of the present invention, network forwarding devices include forwarding devices in the upper layer switching network, such as SDN switches; and forwarding devices in the underlying layer switching network, such as Optical Transport Network (OTN) devices. A southbound protocol (such as an Openflow protocol) is run between the control plane and the forwarding plane device. Details of the fault recovery process of the cross-layer network fault recovery system in the embodiment of the present invention are described below.

The upper layer switching network topology collection module is present in the upper layer switching network controller of the control plane and is used for collecting topology of all upper layer switching network devices in an upper layer data switching network, status of ports of upper layer switching network devices and status of links between the upper layer switching network devices. In addition, the upper layer switching network topology collection module further collects port information and address information of the upper layer switching network devices, traffic statistics information of the ports, matching times of first forwarding tables of upper layer switching network devices, and information of traffic, delay and Quality of Service (QoS) of links. The upper layer switching network topology collection module periodically sends the collected information to the calculation module.

Specifically, the upper layer switching network topology collection module runs a topology discovery protocol (such as Link Layer Topology Discovery (LLTD) protocol) to collect information on attributes, network topology, link states, forwarding device addresses and ports of upper layer switching network devices.

The address resolution module is present in the upper layer switching network controller of the control plane, and is used for obtaining forwarding control information of a new service upon its first entry into an upper layer switching network device, and sending the forwarding control information to the configuration generation and update module.

Specifically, the upper layer switching network device, when receiving a service packet, matches the packet with a first forwarding table. In case of a successful match, the service packet is forwarded, or otherwise, the service packet is sent to the address resolution module in the upper layer switching network controller. The address resolution module analyzes forwarding control information of the service packet sent by the upper layer switching network device, and sends forwarding control information to the calculation module for path calculation, so as to prepare for updating the first forwarding table later.

The fault information module is present in the upper layer switching network controller of the control plane, and is used for receiving and processing fault information, and sending the fault information to the fault location module for fault location.

Specifically, once the upper layer switching network device identifies a fault, it reports the fault information to the fault information module in the upper layer switching network controller. The fault information module decapsulates the fault information, extracts a source and a destination address of the service affected by the fault, and sends the source and the destination address to the fault location module. If the upper layer switching network device identifies a fault, it directly sends fault information, including information of the fault device, to the fault location module. The above fault device information is an ID of the fault device.

The configuration generation and update module is present in the upper switching network controller of the control plane, and is configured for generating upper layer switching network device configuration and update configuration. Upon the arrival of a new service, the upper layer switching network device receives path information sent by a calculation module, generates a first forwarding table, sends the first forwarding table to the fault location module for backup, and delivers the first forwarding table to all upper layer switching network devices on the path. When a fault occurs, the configuration generation and update module receives a third forwarding table sent by the super controller, generates first forwarding table entries to be updated for neighbor devices of the fault device in the upper layer switching network and the backup upper layer switching network device, and delivers the updated first forwarding table entries to the neighbor devices of the fault device in the upper layer switching network and the backup upper layer switching network device.

Specifically, upon the first arrival of a new service on an upper layer switching network device, the calculation module calculates path information for the service and sends the information to the configuration generation and update module. The configuration generation and update module generates a first forwarding table, sends the first forwarding table to the fault location module for backup, and delivers the first forwarding table to all upper layer switching network devices on the path. The first forwarding table entries include an identity of the service, source and destination addresses of the service, an ID of the upper layer switching network device, an ingress port number that the service enters the upper layer switching network device, and an egress port number that the service leaves the upper layer switching network device. When a next service packet arrives, a service identity matching is performed. If the matching is successful, the service packet is forwarded from the egress port in the table; if the matching is unsuccessful, the service packet is sent to the address resolution module for address resolution.

Specifically, when a fault occurs, the configuration generation and update module receives a third forwarding table sent by the calculation module, calculates first forwarding table entries for the backup upper layer switching network device and neighbor devices of the fault upper layer switching network device according to the upper layer switching network information in the third forwarding table, updates first forwarding table entries of these upper layer switching network devices, sends the first forwarding table to the fault location module to update the backup, and delivers the first forwarding table to the relevant upper layer switching network device.

The underlying layer switching network topology collection module exists in the underlying layer switching network controller of the control plane, and is used to collect the topology of all underlying layer switching network devices in the underlying layer data switching network, status of the underlying layer switching network devices, and status of link connections. In addition, the underlying layer switching network topology collection module further collects the port information and address information of underlying layer switching network devices, traffic statistics information of the ports, matching times of first forwarding tables of upper layer switching network devices, and information of traffic, delay and Quality of Service (QoS) of links, and the underlying layer switching network topology collection module periodically sends the collected information to the calculation module.

Specifically, the underlying layer switching network topology collection module runs a topology discovery protocol (such as Link Layer Topology Discovery (LLTD) protocol) to collect information on attributes, network topology, link states, forwarding device addresses and ports of underlying layer switching network devices in the fault recovery system of embodiments of the present application.

A transmission channel adjustment module is present in the underlying layer switching network controller of the control plane, and is used for receiving information sent by the calculation module, generating or updating a second forwarding table, and delivering the second forwarding table to the underlying layer switching network device.

Specifically, when receiving path information sent by the path calculation module, the transmission channel adjustment module generates second forwarding table entries for all underlying layer switching network devices on the underlying layer switching network transmission path to forward the service, updates the second forwarding table entry for all underlying layer switching network devices in the underlying layer switching network transmission path, and delivers the second forwarding table entries to the underlying layer switching network devices on the underlying layer switching network transmission path. The underlying layer switching network controller sends the updated second forwarding table to the super controller, to update the second forwarding table backup in the super controller. The underlying layer switching network controller delivers the updated second forwarding table to underlying layer switching network devices in the underlying layer switching network transmission path. The second forwarding table entries include ID of the underlying layer switching network device, an ingress port number that the data packet enters the underlying layer switching network device, and an egress port number that the data packet leaves the underlying layer switching network device.

When the transmission channel adjustment module receives a third forwarding table sent by the path calculation module, the second forwarding table is updated. The transmission channel adjustment module calculates underlying layer switching network transmission channels for implementing connections between neighbor devices of the fault device in the upper layer switching network and the backup upper layer switching network device in the third forwarding table, calculates and updates second forwarding table entries for underlying layer switching network devices on the transmission channels, and delivers the second forwarding table entries to the underlying layer switching network devices.

The topology generating module is present in the super controller of the control plane, and is used for receiving an upper layer switching network topology result and an underlying layer switching network topology result sent by the upper layer topology collection module and the underlying layer topology collection module, synthesizing a double layer switching network topology, and sending the double layer switching network topology to the calculation module.

Specifically, the topology generation module receives an upper layer switching network topology result and an underlying layer switching network topology result sent by an upper layer topology collection module and an underlying layer topology collection module, synthesizing a double layer switching network topology, establishes a complete double layer switching network topology result according to the connectivity between the two layer devices, and sends the result to the calculation module.

The fault location module is present in the super controller of the control plane, and is used for receiving a first forwarding table backup from the configuration generation and update module, and source and destination addresses of the service affected by the fault or fault device information sent by the fault device information module for fault location, and sending the fault location result to the calculation module. The fault device information may be an ID of the fault device.

Specifically, the fault location module receives source and destination addresses of the service affected by the fault sent by the fault information module, searches a corresponding ID of the fault device in upper layer switching network that transmits the service, and sends the ID to the calculation module.

The calculation module is present in the super controller of the control plane, and is used for receiving a double layer switching network topology result sent by the topology generation module, an ID of the fault device in the upper layer switching network sent by the fault location module, and forwarding control information of a new service sent by the address resolution module, calculating and generating a new transmission path for the new service, calculating and obtaining a recovery path including a backup upper layer switching device for the service affected by the fault, generating a third forwarding table, and delivering the transmission path or the third forwarding table to the configuration generation and updating module and a transmission channel adjustment module.

Specifically, when a new service arrives, the address resolution module analyzes the service packet and sends the service source and destination addresses to the calculation module. The calculation module calculates a service transmission path according to the service address information and the upper and underlying layer switching network topology results sent by the topology generation module, and sends the path result to the configuration generation and update module and the transmission channel adjustment module. The path result includes information of service transmitted by the service, source and destination addresses, IDs of switching devices (including upper layer switching network devices and underlying layer switching network devices) passed on the path, an ingress port number, and an egress port number.

Specifically, when a fault occurs, the calculation module receives an ID of the fault device in the upper layer switching network sent by the fault location module, and searches for a backup upper layer switching network device according to the double layer switching network topology result and attributes of the upper layer switching network devices sent by the topology generation module, and generates a third forwarding table. The result is sent to the configuration generation and update module and the transmission channel adjustment module.

Specifically, the calculation module searches available backup upper layer switching network devices. First, a previous neighbor device and that the service affected by the fault passes before reaching the fault device in the upper layer switching network (referred to as the previous neighbor device, the next neighbor device) areidentified.

Then, according to attributes of the upper layer switching network devices, all upper layer switching network devices that have a switching capacity not less than that of the fault device in the upper layer switching network are searched for. For all the above-mentioned upper layer switching network devices, a transmission path for the service affected by the fault to pass through the underlying layer switching network from the previous neighbor device through this upper layer switching network device to the next neighbor device during calculation. An optimal device is selected from the upper layer switching network devices that meets the conditions as a backup upper layer switching network device for fault recovery.

Specifically, the calculation module generates a third forwarding table. According to the first forwarding table for the neighbor devices of the fault device in the upper layer switching network and the backup upper layer switching network device information, the third forwarding table is generated and sent to the upper layer switching network controller and the underlying layer switching network controller. Specifically, the super controller generates third forwarding table entries, including the connection by which the previous neighbor device, the backup upper layer switching network device and the next neighbor device access the underlying layer switching network through an underlying layer switching network device. The third forwarding table entry includes identification information of the service affected by the fault, source and destination addresses of the service, an ID of a previous neighbor device, an egress port number of the previous neighbor device, an ID of the underlying layer switching network device connected to the previous neighbor device to transmit the service, an ingress port number of the underlying layer switching network device, an egress port number of the underlying layer switching network device, an ID of a backup upper layer switching network device, an ingress port number of the backup upper layer switching network device, an egress port number of the backup upper layer switching network device, an ID of the underlying layer switching network device connected to the backup upper layer switching network device, an ingress port number of the underlying layer switching network device, an egress port of the underlying layer switching network device, an ID of the underlying layer switching network device for transmitting the service connected to the next neighbor device, an ingress port number of the underlying layer switching network device, an egress port number of the underlying layer switching network device. Each third forwarding table entry includes the connection between the previous neighbor device that transmits a service affected by the fault, the backup upper layer switching network device, the next neighbor device and the underlying layer switching network. The third forwarding table is a combination of all the third forwarding table entries.

Figure 3:
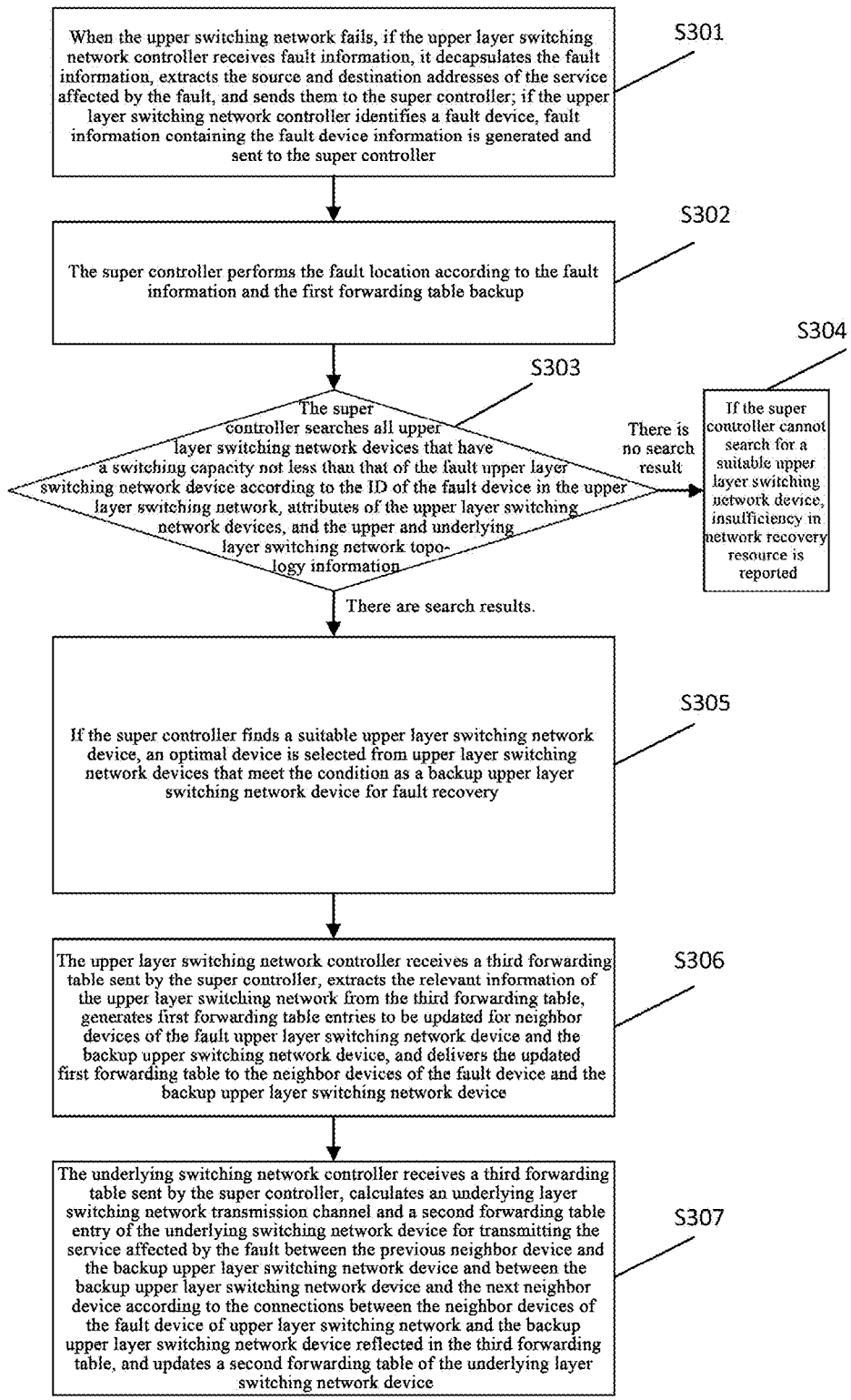
FIG. 3 is a flow diagram of a low delay cross-layer network fault recovery method according to an embodiment of the present invention.

In order to achieve the above objective, the present invention disclosures a low delay cross-layer network transmission and fault recovery method, as shown in FIG. 3. It should be noted that this method is applied to the above system.

The upper layer network controller and the underlying layer network controller respectively collect the topology of all switching network devices in a upper layer switching network and a underlying layer switching network, switching network device attributes, and status of ports and linked path. The upper layer switching network controller and the underlying layer switching network controller send the upper and underlying layer network topology results to the super controller.

When the upper layer switching network device receives a service for the first time, the upper layer switching network device sends a service packet to the upper layer switching network controller. The upper layer switching network controller extracts forwarding information (such as source and destination addresses, service identification information, etc.) from the data packet and sends the forwarding information to the super controller.

The super controller calculates, according to the service information sent by the upper layer network controller and topology results of the upper layer and underlying layer switching networks, upper layer and underlying layer switching network transmission paths of the service. The results of the upper layer switching network transmission path and the underlying layer switching network transmission path are respectively sent to the upper layer switching network controller and the underlying layer switching network controller. The results of the upper layer switching network transmission path and the underlying layer switching network transmission path need to include service information, transmission path device information, and transmission path port information. For example, the results include source and destination addresses of the service, IDs of switching devices on the path, an ingress port number, and an egress port number.

The upper layer switching network controller generates a first forwarding table entry for each upper layer switching network device in the upper layer switching network transmission path to forward the service according to the result of the upper layer switching network transmission path, and updates the first forwarding table of each upper switching network device in the upper layer switching network transmission path. The upper layer switching network controller sends the updated first forwarding table to the super controller to update the first forwarding table backup in the super controller. The upper layer switching network controller delivers the updated first forwarding table to each upper layer switching network device in the upper layer switching network transmission path. The first forwarding table entries needs to include service information, information of upper layer switching network devices through which the service passes, and information of upper layer switching network device ports through which the service passes. For example, the first forwarding entries include service identification information, source and destination host addresses of the service, an ID of the upper layer switching network device, a number of the ingress port through the service enters the upper layer switching network device, and a number of an egress port through which the service leaves the upper layer switching network device. The upper layer switching network controller delivers the updated first forwarding table to each upper layer switching network device in the upper layer switching network transmission path.

When the next service arrives, a service identification information matching is performed, and if the matching is successful, the service is forwarded through the egress port in the table; if the matching is unsuccessful, the service packet is sent to the upper layer switching network controller.

The underlying layer switching network controller generates a second forwarding table entry for each underlying layer switching network in the underlying layer switching network transmission path to forward the service according to the result of the underlying layer switching network transmission path, updates the second forwarding table and delivers the second forwarding table to each underlying layer switching network device in the underlying layer switching network transmission path. The underlying layer switching network controller sends the updated second forwarding table to the super controller, and updates the second forwarding table backup in the super controller. The underlying layer switching network controller delivers the updated second forwarding table to each underlying layer switching network device in the underlying layer switching network transmission path. The second forwarding table entry needs to include device information and port information required for service forwarding in the underlying layer network, such as an ID of the underlying layer switching network device, the number of the ingress port through the service enters the underlying layer switching network device, and the number of the egress port through which the service leaves the underlying layer switching network device.

S301, when the upper switching network fails, if the upper layer switching network controller receives fault information, it decapsulates the fault information, extracts the source and destination addresses of the service affected by the fault, and sends them to the super controller; if the upper layer switching network controller identifies a fault device, fault information containing the fault device information is generated and sent to the super controller. The above fault information is an ID of the fault device.

S302, the super controller performs the fault location according to the fault information and the first forwarding table backup.

S303, the super controller searches all upper layer switching network devices that have a switching capacity not less than that of the fault upper layer switching network device according to the ID of the fault device in the upper layer switching network, attributes of the upper layer switching network devices, and the upper and underlying layer switching network topology information. For all the above-mentioned upper layer switching network devices, there is a transmission path for the service affected by the fault to pass through the underlying layer switching network from the previous neighbor device through this upper layer switching network device to the next neighbor device during calculation. The previous neighbor device and the next neighbor device are respectively a previous neighbor device and a next neighbor device that the service affected by the fault passes before reaching the fault upper layer switching network device.

S304, if the super controller cannot search for a suitable upper layer switching network device, insufficiency in network recovery resource is reported.

S305, if the super controller finds a suitable upper layer switching network device, an optimal device is selected from the upper layer switching network devices that meet the condition as a backup upper layer switching network device for fault recovery. The super controller determines the connections between the backup upper layer switching network device and all neighbor devices of the fault upper layer switching network device, and the connections between the backup upper layer switching network device, all neighbor devices of the fault device in the upper layer switching network with the underlying layer switching network device based on at least the first forwarding table of all neighbor devices of the fault device, generates a third forwarding table, and delivers the third forwarding table to the upper layer switching network controller and the underlying layer switching network controller; The third forwarding table entry needs to include service information, information of devices through which the service passes, and information of device ports through which the service passes. For example, the third forwarding table entry includes service identification information, an ID of a previous neighbor device, the number of an egress port of the previous neighbor device, an ID of the underlying layer switching network device connected to the previous neighbor device, the number of an ingress port of the underlying layer switching network device, the number of an egress port of the underlying layer switching network device, an ID of a backup upper layer switching network device, the number of an ingress port of the backup upper layer switching network device, the number of an egress port of the backup upper layer switching network device, an ID of the underlying layer switching network device of a next neighbor connected to the backup upper layer switching network device, the number of an ingress port of the underlying layer switching network device, an egress port of the underlying layer switching network device, an ID of the next neighbor device, the number of an ingress port of the next neighbor device. Each third forwarding table entry is utilized to forward a service affected by the fault from the previous neighbor device through the backup upper layer switching network device to the next neighbor device. Third forwarding table is a combination of third forwarding table entries.

S306, the upper layer switching network controller receives a third forwarding table sent by the super controller, extracts the relevant information of the upper layer switching network from the third forwarding table, generates first forwarding table entries to be updated for neighbor devices of the fault upper layer switching network device and the backup upper switching network device, and delivers the updated first forwarding table to the neighbor devices of the fault device and the backup upper layer switching network device. The first forwarding table entry needs to include service information in the neighbor devices of the fault upper layer switching network device and the backup upper layer switching network device, information of upper layer switching network devices through which the service passes, and information of upper layer switching network device ports through which the service passes. For example, the first forwarding table entry includes service identification information, source and destination host addresses of the service, an ID of the upper layer switching network device, the number of the ingress port through which the service enters the upper layer switching network device, and the number of the egress port through the service leaves the upper layer switching network device. The upper layer switching network controller sends the updated first forwarding table to the super controller, and updates the first forwarding table backup in the super controller.

S307, the underlying switching network controller receives a third forwarding table sent by the super controller, calculates an underlying layer switching network transmission channel and a second forwarding table entry of the underlying switching network device for transmitting the service affected by the fault between the previous neighbor device and the backup upper layer switching network device and between the backup upper layer switching network device and the next neighbor device according to the connections between the neighbor devices of the fault device of upper layer switching network and the backup upper layer switching network device reflected in the third forwarding table, and updates a second forwarding table of the underlying layer switching network device. The second forwarding table entry includes the underlying layer switching network device information and port information on the transmission channel between the neighbor devices of the fault upper layer switching network device and the backup upper layer switching network device. For example, it includes an ID of the underlying layer switching network device, an ingress port number that the service enters the upper layer switching network device, and an egress port number that the service leaves the upper layer switching network device.

What is claimed is:

1. A cross-layer network fault recovery system based on configuration migration, comprising: at least one upper layer switching network controller, at least one underlying layer switching network controller, at least one super controller, at least two upper layer switching network devices and at least one underlying layer switching network device, wherein, the upper layer switching network controller sends fault information of the upper layer switching devices to the super controller, and receives a third forwarding table generated and sent by the super controller for fault recovery; wherein the third forwarding table describes connections and service switching behaviors between neighbor devices of the fault device, the backup upper layer switching network device and the underlying layer switching network device; and switching behaviors of upper layer services by the backup upper layer switching network device; and, "neighbor devices of the fault device" are upper layer switching network devices directly connected with the fault device in the upper layer switching network in its original view;

the super controller receives the fault information sent by the upper layer switching network controller, and performs fault location according to the fault information and a topology table; selects an appropriate backup upper layer switching network device in the upper layer switching network at least according to a result of the fault location, the topology table and attributes of the upper layer switching network devices; determines upper layer switching network connections between neighbor devices of the fault device and the backup upper layer switching network device selected by the super controller, and connections between the backup upper layer switching network device, all neighbor devices of the fault device and the underlying layer switching network device, and generates, based on the connections, the third forwarding table and send the third forwarding table to the upper layer switching network controller and the underlying layer switching network controller; and the underlying layer switching network controller receives the third forwarding table sent by the super controller, and updates a second forwarding table of the underlying layer switching network device according to the third forwarding table; the second forwarding table describes switching behaviors of an underlying layer service by underlying layer switching network devices, comprising information of device ports through which the underlying layer service passes.

2. The system of claim 1, wherein, the upper layer switching network controller generates, when a network fault occurs, the fault information of the upper layer switching network devices by receiving the fault information sent by an upper layer switching network device or actively identifying a fault in the upper layer switching network devices; sends the fault information to the super controller; receives the third forwarding table sent by the super controller, generates first forwarding table entries to be updated for neighbor devices of the fault device and the backup upper layer switching network device, and delivers the updated first forwarding table to neighbor devices of the fault device and the backup upper layer switching network device; the first forwarding table describes switching behaviors of an upper layer service by upper layer switching network devices, comprising information of device ports through which the upper layer service passes.

3. The system of claim 1, wherein the upper layer switching network controller further comprises:
a fault information module, configured for receiving and processing fault information sent by the upper layer switching network devices, and sending the fault information to a fault location module for fault location; and
a configuration generation and update module, configured for generating configuration information and updating configuration for the upper layer switching network devices; when the network is operating normally, receiving, upon the entry of a new service into the network, information of a path sent by a calculation module, generating a first forwarding table and send the first forwarding table to a fault location module for backup, and updating the first forwarding table for all upper layer switching network devices on the path; receiving, when a fault occurs, the third forwarding table sent by the super controller, generating first table entries to be updated for neighbor devices of the fault device and the backup upper layer switching network device, and delivering updated first forwarding table entries to neighbor devices of the fault device and the backup upper layer switching network device; the first forwarding table describes switching behaviors of an upper layer service by upper layer switching network devices, comprising information of device ports through which the upper layer service passes.

4. The system of claim 1, wherein the underlying layer switching network controller receives the third forwarding table sent by the super controller, calculates underlying layer switching network transmission channels for implementing connections between neighbor devices of the fault device and the backup upper layer switching network device reflected in the third forwarding table, and updates the second forwarding table of the underlying layer switching network device on the transmission channels.

5. The system of claim 1, wherein the underlying layer switching network controller further comprises: a transmission channel adjustment module for receiving information sent by a calculation module of the super controller, generating or updating the second forwarding table, and delivering the second forwarding table to the underlying layer switching network device.

6. The system of claim 1, wherein
the super controller receives, when a network fault occurs, fault information sent by the upper layer switching network controller, and determines a fault port of a fault device in the upper layer switching network; selects an appropriate backup upper layer switching network device in the upper layer switching network according to a result of the fault location, the topology table, information of the fault device and attributes of the upper layer switching network devices; and further generates the third forwarding table at least according to first forwarding table entries of all neighbor devices of the fault device; the first forwarding table describes switching behaviors of an upper layer service by upper layer switching network devices, comprising information of device ports through which the upper layer service passes.

7. The system of claim 1, wherein the backup upper layer switching network device can communicate with neighbor devices of the fault device through the underlying layer switching network and transmit a service affected by the fault, so as to ensure that the backup upper layer switching network device can take place of the fault device in the upper layer switching network.

8. The system of claim 1, wherein the topology table comprises connections between upper layer switching network devices, connections between underlying layer switching network devices, and connections between upper layer switching network devices and underlying layer switching network devices;
the first forwarding table describes switching behaviors of an upper layer service by upper layer switching network devices, comprising information of device ports through which the upper layer service passes.

9. The system of claim 1, wherein the super controller further comprises:
a fault location module, configured for receiving backup of a first forwarding table from a configuration generation and update module of the upper layer switching network controller and fault information sent by a fault information module of the upper layer switching network controller for fault location, and sending a result of the fault location to a calculation module of the super controller; and
the calculation module is configured for selecting a device from the upper layer switching network devices as a backup upper layer switching network device of the fault device according to the topology table, a result of the fault location and attributes of the upper layer switching network devices, and generating the third forwarding table at least according to first forwarding table entries of all neighboring devices of the fault device; wherein, the switching capacity of the backup upper layer switching network device selected by the calculation module is not lower than the switching capacity of the fault device, and the backup upper layer switching network device can communicate with the neighbor devices of the fault device through the underlying layer switching network, so as to ensure that the backup upper layer switching network device can completely take place of the fault device;

wherein, the first forwarding table describes switching behaviors of an upper layer service by upper layer switching network devices, comprising information of device ports through which the upper layer service passes.

10. A cross-layer network fault recovery method based on configuration migration, applicable to a double layer switching network comprising an upper layer switching network and an underlying layer switching network, the method comprises:

when a service fault occurs in the upper layer switching network, an upper layer switching network controller receives and processes fault information sent by an upper layer switching network device or generating fault information by identifying a fault in an upper layer switching network device, and sends the fault information to a super controller;

the super controller searches, according to the fault information and a first forwarding table, for a fault device in the upper layer switching network for fault device location;

the super controller selects a backup upper layer switching network device in the upper layer switching network at least according to topology information, a result of the fault device location and attributes of the upper layer switching network devices;

the super controller generates a third forwarding table at least according to first forwarding table entries for all neighbor devices of the fault device, and delivers the third forwarding table to the upper layer switching network controller and an underlying layer switching network controller; wherein, the neighbor devices of the fault device are devices directly connected with the fault device in the original upper layer switching network;

the upper layer switching network controller generates first forwarding table entries to be updated for neighbor devices of the fault device and a backup upper layer switching network device according to the third forwarding table, and delivers the updated first forwarding table entries to neighbor devices of the fault device and the backup upper layer switching network device; and the underlying layer switching network controller calculates underlying layer switching network transmission channels for implementing connections between neighbor devices of the fault device and the backup upper layer switching network device reflected in the third forwarding table, and updates a second forwarding table of underlying layer switching network devices on the transmission channels;

wherein, the first forwarding table describes switching behaviors of an upper layer service by upper layer switching network devices, comprising information of device ports through which the upper layer service passes; the second forwarding table describes switching behaviors of an underlying layer service by underlying layer switching network devices, comprising information of device ports through which the underlying layer service passes; and the third forwarding table describes connections and service switching behaviors by neighbor devices of the fault device and the backup upper layer switching network device with the underlying layer switching network device, and switching behaviors of upper layer services by the backup upper layer switching network device.

11. The fault recovery method of claim 10, wherein the super controller selecting a backup upper layer switching network device comprises:

the super controller selects an appropriate backup upper layer switching network device in the upper layer switching network according to topology information, a result of fault location, and attributes of the upper layer switching network devices; wherein, the backup upper layer switching network device can take place of the fault device in the upper layer switching network and communicate with neighbor devices of the fault device through the underlying layer switching network and can transmit a service affected by the fault.

12. The fault recovery method of claim 10, wherein the upper layer switching network controller generating first forwarding table entries to be updated comprises:

the upper layer switching network controller extracts, according to the third forwarding table sent by the super controller, relevant information of the upper layer switching network, and generates first forwarding table entries to be updated for neighbor devices of the fault device in the upper layer switching network and the backup upper layer switching network device; the first forwarding table entries comprise information of a service affected by the fault of the neighbor devices of the fault device in the upper layer switching network and the backup upper layer switching network device, information of upper layer switching network devices through which the service affected by the fault passes, and information of upper layer switching network device ports through which the service affected by the fault passes.

13. The fault recovery method of claim 10, wherein the underlying layer switching network controller calculating underlying layer switching network transmission channels for implementing connections between neighbor devices of the fault device and the backup upper layer switching network device reflected in the third forwarding table, and updates a second forwarding table of underlying layer switching network devices on the transmission channels comprises:

the underlying layer switching network controller calculates and obtains, according to the third forwarding table, underlying layer switching network transmission channels for connecting the neighbor devices of the fault device with the backup upper layer switching network device, and generates second forwarding table entries; the second forwarding table entries comprise information of underlying layer switching network devices and ports on transmission channels between neighbor devices of the fault device and the backup upper layer switching network device.

14. The fault recovery method of claim 10, wherein
the super controller determines connections between the backup upper layer switching network device and all neighbor devices of the fault device, connections between the backup upper layer switching network device, all neighbor devices of the fault device and underlying layer switching network devices, and then generates the third forwarding table; the third forwarding table includes information of a service affected by the fault, information of devices through which the service affected by the fault passes, and information of device ports through which the service affected by the fault passes; wherein, devices through which the service affected by the fault passes comprise the neighbor devices of the fault device and the backup upper layer switching network device, and the underlying layer switching network device connected to the neighbor devices and the backup upper layer switching network device.

* * * * *

UNITED STATES PATENT AND TRADEMARK OFFICE
CERTIFICATE OF CORRECTION

PATENT NO.         : 11,431,556 B2  
APPLICATION NO.    : 17/192151  
DATED              : August 30, 2022  
INVENTOR(S)        : Rentao Gu et al.

Page 1 of 1

It is certified that error appears in the above-identified patent and that said Letters Patent is hereby corrected as shown below:

On the Title Page

Item (73) Assignees should read: Beijing University of Posts and Telecommunications, Beijing (CN); State Grid Liaoning Power Co., Ltd. Dalian Power Supply Company, Dalian (CN)

Signed and Sealed this  
Thirteenth Day of December, 2022

Katherine Kelly Vidal  
*Director of the United States Patent and Trademark Office*